United States Patent [19]
Kawano et al.

[11] Patent Number: 5,329,538
[45] Date of Patent: Jul. 12, 1994

[54] CIRCUIT FOR PROVIDING DIGITAL DATA HAVING HIGH CLARITY IN A DIGITAL SIGNAL RECEIVER

[75] Inventors: Hisato Kawano; Takashi Tabu; Shigeru Sekine; Masaki Kira, all of Kawasaki, Japan

[73] Assignee: Fujitsu Limited, Kawasaki, Japan

[21] Appl. No.: 846,939

[22] Filed: Mar. 6, 1992

[30] Foreign Application Priority Data

Mar. 8, 1991 [JP] Japan .................. 3-043221

[51] Int. Cl.⁵ .............................. G06F 11/00
[52] U.S. Cl. .................... 371/57.2; 371/65; 371/25.1; 328/120
[58] Field of Search ........ 371/57.2, 57.1, 48, 371/64, 30, 31, 40.1, 40.2, 40.3, 65, 25.1; 328/120; 375/108

[56] References Cited

U.S. PATENT DOCUMENTS

| | | | |
|---|---|---|---|
| 3,643,027 | 2/1972 | Goldberg | 371/57.2 |
| 3,652,943 | 3/1972 | Piccirilli et al. | 371/57.2 |
| 3,961,203 | 6/1976 | Hutch | 307/236 |
| 3,997,798 | 12/1976 | Breimesser | 307/234 |
| 4,353,032 | 10/1982 | Taylor | 371/57.1 |
| 4,775,840 | 10/1988 | Ohmori et al. | 328/111 |
| 5,138,636 | 8/1992 | Bardin | 375/108 |

*Primary Examiner*—Robert W. Beausoliel, Jr.
*Assistant Examiner*—Phung M. Chung
*Attorney, Agent, or Firm*—Staas & Halsey

[57] ABSTRACT

In the present invention, input data are extracted by a clock and compared with the previous input data. A cyclic counter is provided for cyclically counting clock signals in each noise erasure time period (the maximum retaining time of a signal referred to as noise). When a change is detected in input data, the counter value is stored. When the input data indicate no changes, the counter value and the stored counter value are compared. If a non-coincident result is outputted, it indicates that the noise erasure time has not passed since the input data indicated a change. Therefore, the input data are not outputted. If a coincident result is outputted, it indicates that the cyclic counter counted one cycle. That is, the noise erasure time has passed. Therefore, the input data are outputted since the input data are not recognized as noise.

3 Claims, 6 Drawing Sheets

CIRCUIT FOR PROVIDING DIGITAL DATA HAVING HIGH CLARITY IN A DIGITAL SIGNAL RECEIVER

BACKGROUND OF THE INVENTION

The present invention relates to a digital noise erasing method executed with a circuit of an efficient scale for erasing noise contained in time-series digital input signals regardless of signal retaining time.

Input signals received in time series include signals indicating ON/OFF states generated by relays, etc., and direct current dial signals generated by telephone units. When such time-series signals are detected or received, errors may frequently be detected due to noise generated by chattering, etc., at a relay joint, but disappearing within a predetermined time period. That is, after a signal inputted in time series turns from "0" (OFF) to "1" (ON), a "0" (OFF) state is generated for a short time. If such noise is received as is, control is executed incorrectly.

In the prior art technologies, a detecting signal for detecting a change in a digital input signal is generated together with an extracting signal for extracting the digital input signal according to a clock signal, and extracted signals are stored in separate memories. The digital input signals are not outputted as noise (erased) if they become changed before being stored as the same signals ("0s" or "1s") in a predetermined number of memories. The input signals are outputted as accepted data if the same signals ("0s" or "1s") are stored without any change in a predetermined number of memories.

FIG. 1 shows the circuit configuration of a prior art device for erasing noise according to the above described method.

First, $d_{in}$ 100 applies digital input signals ("1" or "0") to a distributing circuit 110. The distributing circuit 110 is connected to n 1-bit memories 120 (120-1–120-n). The distributing circuit 110 distributes the digital input signals $d_{in}$ according to a clock signal 170 and sequentially stores them in the memories 120.

The n memories 120 are connected to a comparator 130. The comparator 130 sequentially determines whether or not there is a change in the digital signals ("1" or "0") stored in the memories 120, and outputs a signal 180 to indicate that a change is detected". The outputted signal 180 is a selection signal for a selector 140. The selector 140 is connected to the n-th memory 120-n and to a memory 150 provided separately, and outputs the value of either memory 120-n or 150 as an output value $d_{on}$ 160. The output from the selector 140 is connected to the memory 150 and the value outputted from the selector is stored in the memory 150.

That is, in the initial state, the first digital input signal value ("1" or "0") is set in the memory 150. Then, the following digital input signal values are sequentially stored in the memories 120 (120-1–120-n). Each time an input signal is stored in one of the memories 120, the comparator compares the value currently stored in this memory 120 with the value previously stored. If a change is detected, a selection signal 180 indicating "a change is detected" is outputted. Then the value stored in the memory 150 is selected and outputted as $d_{on}$ 160. If the digital input signal values stored in all of the memories 120 are all equal, the selection signal 180 indicates "no changes" when the comparator finishes comparing the values in memory 120-n and the memory 120-(n−1). If the selection signal 180 indicates "no changes", the selector 140 selects the value stored in memory 120-n, outputs it as $d_{on}$ 160, and stores it in the memory 150.

In the above described circuit configuration, inputted signals are determined to be noise and are erased unless n equal signals are inputted. The number n of the memories 120 is set as the noise erasure time (the maximum time of a signal to be erased as noise). That is, if a signal having a clock signal cycle of 250 μs and a retaining time equal to or less than 14 ms is defined as noise, a total of 56 units (that is, 56 bits) of memories 120 are required.

As described above, in the prior art technology, sufficient memories for storing a predetermined number of signals (having a capacity for a predetermined time period) are required. Therefore, if a longer noise erasure time is set, the memory capacity must be larger. That is, since the circuit is built in an input interface LSI, etc., of a system which processes digital input signals, a large memory causes the problem that the digital unit must be large and uneconomical.

Besides, a system in which noise erasure time can be changed must have a large memory capacity and the circuit must be modified as necessary, thus making the method troublesome.

SUMMARY OF THE INVENTION

The present invention has been developed based on the above described background. An object of the present invention is to efficiently erase noise in time-series digital input signals without extending a memory area, regardless of the noise erasure time.

The present invention relates to a method for erasing noise, where a signal contained in a digital input signal and retained for less than a predetermined time period is referred to as noise to be erased.

The present invention comprises a counter, a count storage unit, a comparator and output storage unit.

The counter is for cyclically counting clock signals in the noise erasure time (the maximum retaining time of a signal referred to as noise).

The count storage unit is for storing the value provided by the counter when a change is detected in new data extracted from input signals for each clock and compared with the previous data.

The comparator is for comparing the value stored in the count storage unit with the current value of the counter when no changes are detected between the new data and the previous data, and for outputting a coincident/non-coincident result.

The output storage unit is for storing the current data as output data when the comparator determines that the new data and the previous data match.

In the above configuration of the present invention, the count storage unit stores a counter value provided by the counter when a change occurs in an input signal. If the change in the input signal does not refer to noise, the input signal does not indicate a change within the noise erasure time for the following data, and the comparator compares for each piece of data the value provided by the counter with the value stored by the count storage unit. Since the value stored in the counter is cyclically counted based on the noise erasure time, it is stored in the output storage unit when the value provided by the counter and the value stored by the count storage unit match after the noise erasure time, and the input signal is recognized as non-noise.

If an input signal indicates noise, the input signal changes again within the noise erasure time, a new value provided by the counter is stored by the count storage unit, and the input signal is not stored by the output storage unit. That is, it is erased as noise.

The configuration of the present invention requires storage elements of a smaller capacity to be used in a noise erasure process, and thus enables a memory to be utilized efficiently. Besides, when a lot of input signals are used in the same process, peripheral elements such as counters can be shared among them, thus further increasing the efficiency of the circuit configuration.

The noise erasure time can be easily modified by changing the cyclic counter value of the counter, thus realizing a flexible system configuration. Therefore, the noise erasure time can be simultaneously set when a number of input signals are processed.

BRIEF DESCRIPTION OF THE DRAWINGS

Other objects and features of the present invention can be easily recognized by referring to the attached drawings and the descriptions of preferred embodiments.

DESCRIPTION OF THE PREFERRED EMBODIMENTS

Explanation of the Principle

Figure 1:
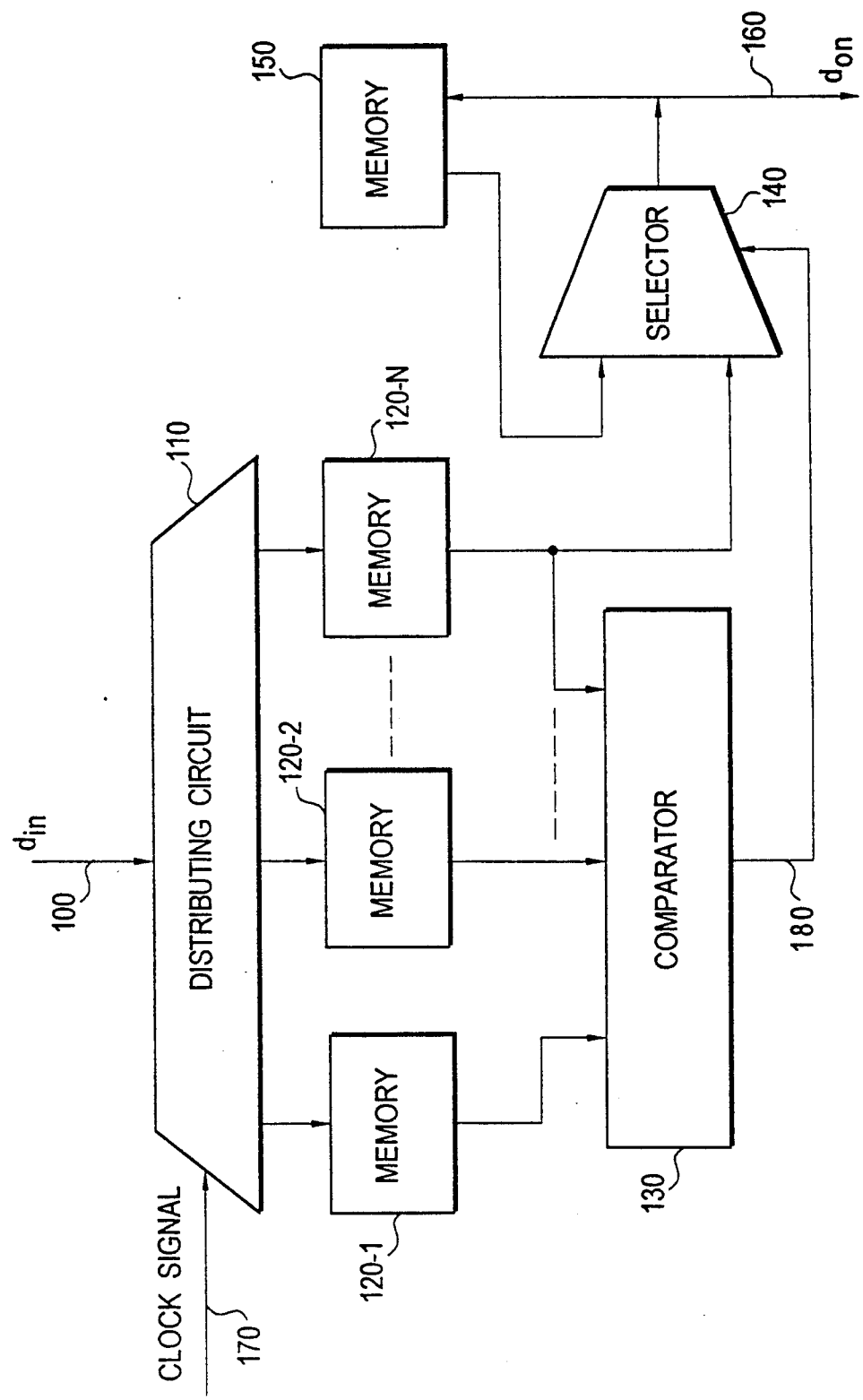
FIG. 1 shows the circuit configuration of the prior art device.
Figure 2:
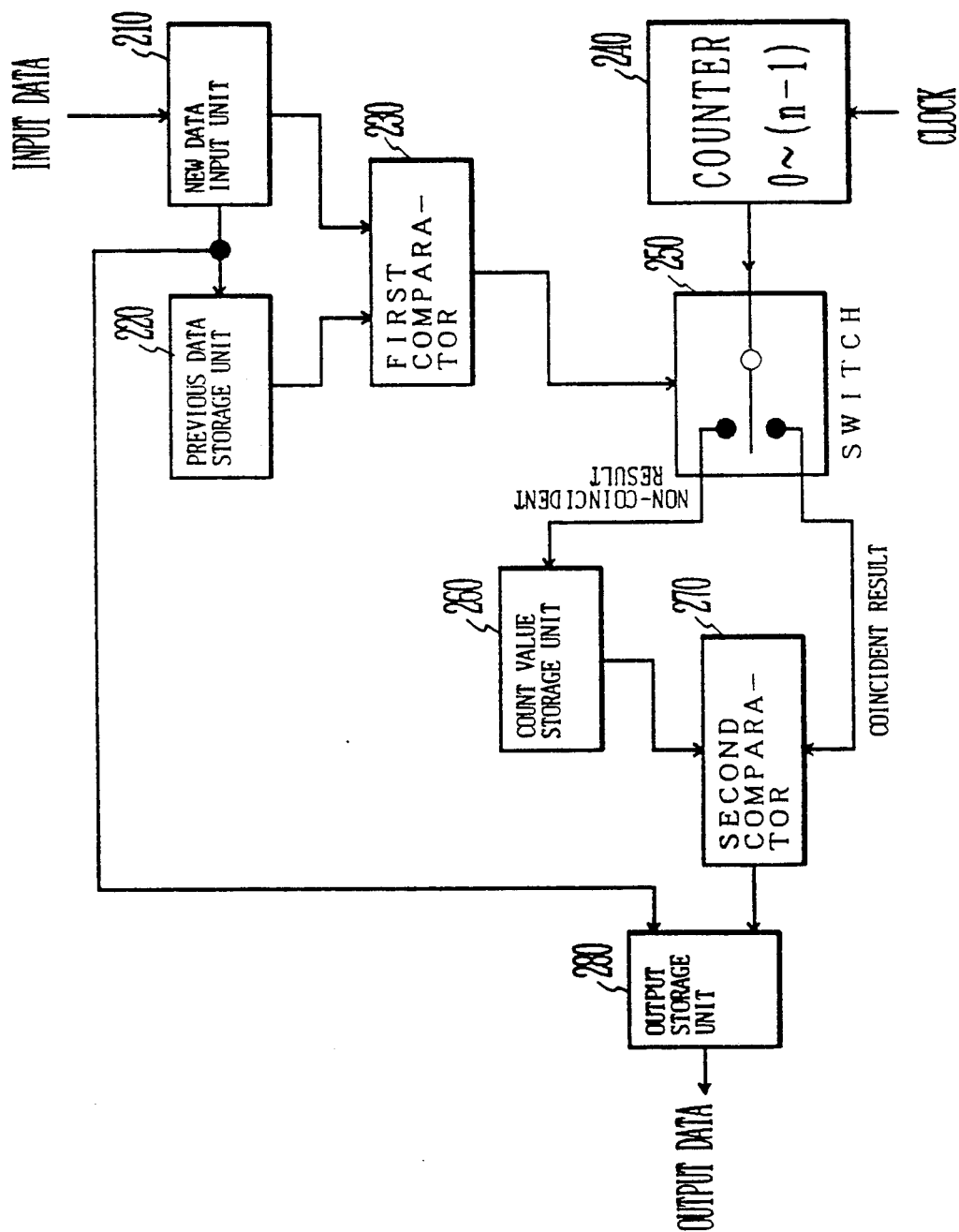
FIG. 2 is a view for explaining the principle of the present invention.

FIG. 2 is a view for explaining the principle of the present invention.

In FIG. 2, 210 is a new data input unit; 220 is a previous data storage unit; 230 is a first comparator; 240 is a counter for counting a clock for a predetermined value (the predetermined value depends on the noise erasure time, cyclically counted from the value 0 to n−1); 250 is a switch for switching the value of the counter 240 according to the value outputted by the first comparator 230; 260 is a count value storage unit for storing a value provided by the counter 240 when the first comparator 230 outputs a non-coincident result; 270 is a second comparator for comparing the value stored by the count value storage unit 260 with the value provided by the counter 240 when the first comparator 230 outputs a coincident result; and 280 is an output storage unit for storing the value provided by the new data input unit 210 when the second comparator 270 outputs a coincident result.

Time-series input signals are applied to the new data input unit 210 according to a clock. The first comparator 230 compares the value provided by the new input unit 210 with the contents of the previous data storage unit 220 for storing the previous data, and generates either a coincident output (no changes) or a non-coincident output (a change has occurred) in binary numbers to control the switch 250.

The counter 240 comprises an n-carry counter for counting a clock. It cyclically generates a value 0−n−1 and applies it to the switch 250. When the first comparator 230 generates a non-coincident output (a change has occurred) the switch 250 is switched up to store the count value in the count value storage unit 260. If the first comparator 230 generates a coincident output (no changes), the switch 250 is switched down to apply to the second comparator 270 the current count value provided by the counter 240. The second comparator 270 compares the count value with the contents of the count value storage unit 260. When these values match, a coincident output is transferred to the output storage unit 280. In response, the output storage unit 280 stores the contents of the new data input unit 210.

That is, when input data indicates a change, the count value ("0", for example) is stored in the count value storage unit 260. If the input data do not indicate another change, the switch 250 is switched down and the counter 240 keeps on counting. During this process, the second comparator 270 compares values. Normally, the values do not match immediately. If the input data indicate no changes after the first change, the second comparator 270 generates a coincident output when the count value of the counter 240 indicates "0" preceded by "n−1", and the output storage unit 280 is driven with the input data stored and recognized as output data other than noise.

If input data indicate a change before the counter 240 outputs "0" (before n clock time passes), the count value storage unit 260 stores a new count value, thus causing the contents to be changed. Therefore, the second comparator 270 generates no coincident outputs and the data stored so far are erased as noise (not stored as output data by the output storage unit 280).

FIG. 2 is a view for explaining the erasure of noise in a piece of input data. Another configuration can be established such that noise is erased in a time divisional manner from plural pieces of input data.

Explanation of Preferred Embodiments

Preferred embodiments of the present invention are explained below.

Figure 3:
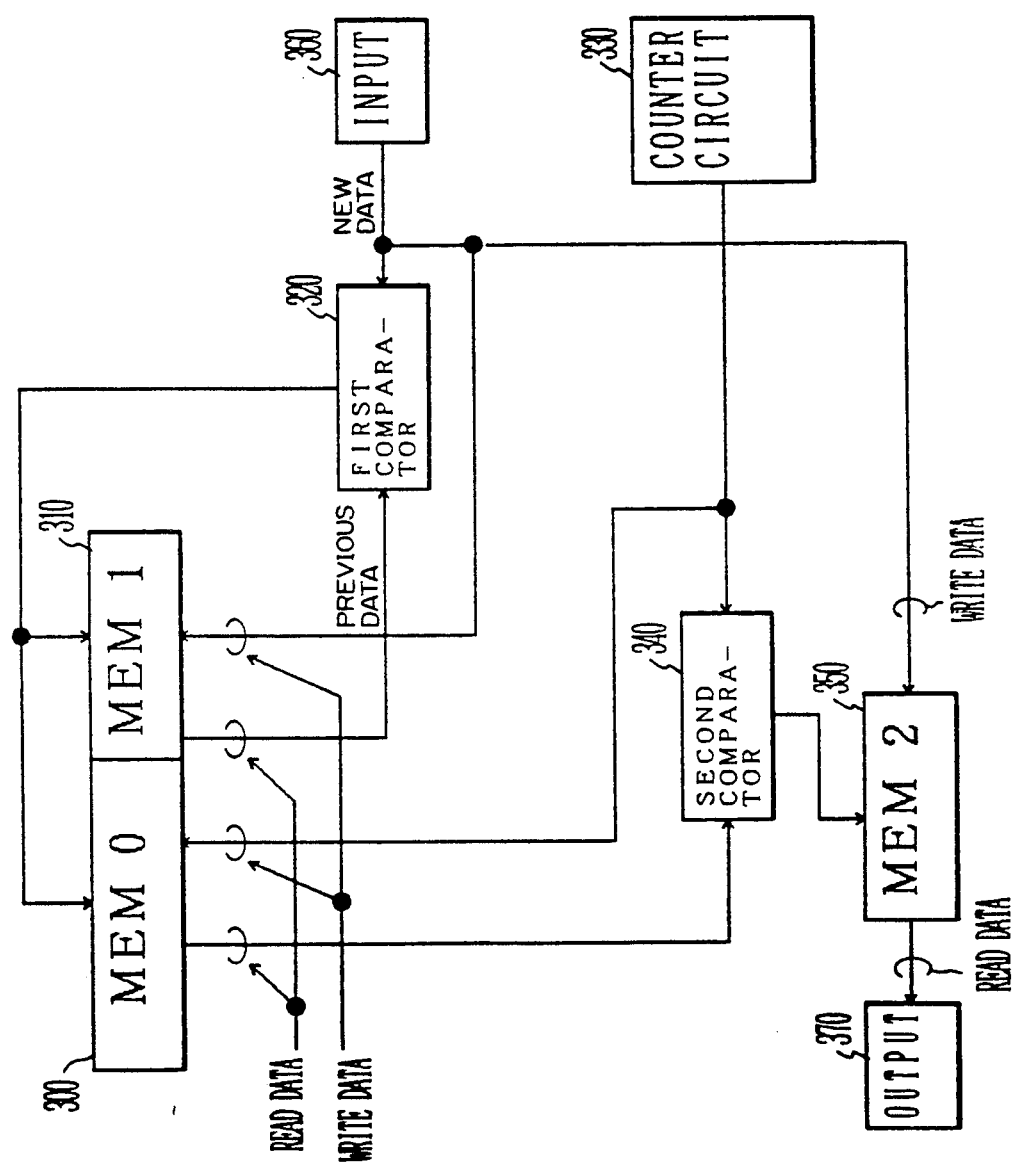
FIG. 3 shows the configuration of the first preferred embodiment of the present invention.

FIG. 3 shows the configuration of the first preferred embodiment.

In FIG. 3, 300 is a memory area 0 (MEM 0 corresponding to the count value storage unit 260 shown in FIG. 2); 310 is a memory area 1 (MEM 1 corresponding to the data storage 220 shown in FIG. 2); 320 is a first comparator (corresponding to 230 shown in FIG. 2); 330 is a counter circuit (corresponding to 240 shown in FIG. 2); 340 is a second comparator (corresponding to 270 shown in FIG. 2); 350 is a memory area 2 (MEM2 corresponding to the output storage unit 280 shown in FIG. 2); 360 is an input unit; and 370 is an output unit. Each of MEM 0 - MEM 2 (300, 310, and 350) occupies a different area in the same storage unit.

The counter circuit 330 operates based on a cycle (time) defined for erasing noise. If the cycle is set to 3, it repeats counting 0 - 2.

Next, the operation of the configuration shown in FIG. 3 is described below.

When new data are inputted from the input unit 360, the previous data stored in the MEM 1 310 are read out, and the first comparator 320 compares the new data with the previous data. If the comparator outputs a non-coincident result (the new data are different from the previous data), a WRITE instruction is issued to the MEM 1 310 to store the new data, while a WRITE instruction is also issued to the MEM 0 300 to store the value of the counter circuit 330, thus starting the noise erasure process.

When the first comparator 320 outputs a coincident result (the new data are the same as the previous data), a READ instruction is issued to the MEM 0 300 and the second comparator 340 compares the value provided by the counter circuit 330 with the contents of the MEM 0 300. If a coincident result is outputted, it means that the counter circuit 330 has operated for one cycle based on the noise erasure cycle (time), and that the same signal has been retained for the time period set by the counter circuit 330. Thus, the data are not recognized as noise, and the new data (input values) are written to the MEM 2 350. Since the second comparator 340 works only when the first comparator generates a coincident result, the contents of the MEM 1 310, that is, the previous data, can be written to the MEM 2 350.

If the second comparator 340 outputs a non-coincident result, it means that the counter circuit 330 has not operated for one cycle, and that the noise erasure time set by the counter circuit 330 has not passed yet. Therefore, nothing is written to the MEM 2 350, but a READ instruction is issued to the MEM 2 350 to output the previously-stored noise-erased data to the output 370.

Figure 4:
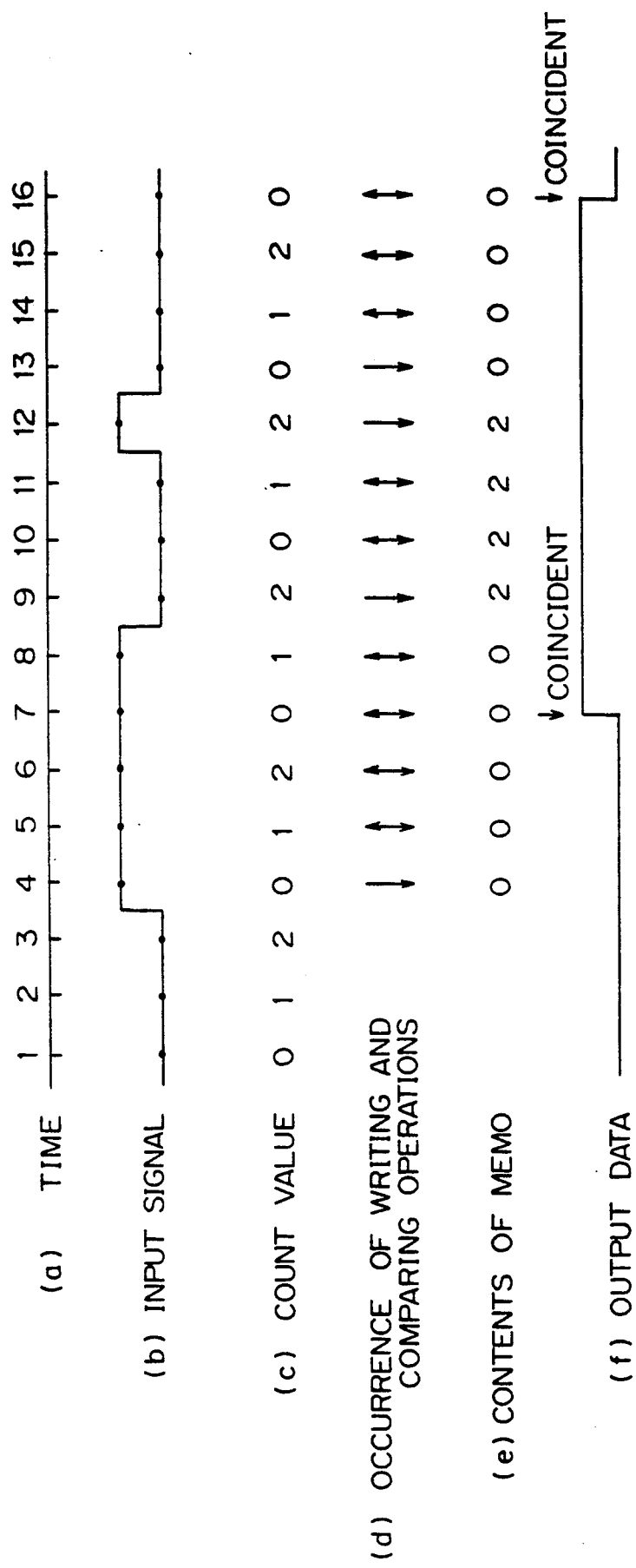
FIG. 4 is a time chart of a preferred embodiment of the present invention.

FIG. 4 is a time chart for explaining the preferred embodiment.

(a) indicates the time corresponding to the interval of the generation of a clock signal. (b) is an example of an input signal, in which input data are extracted at the timing of each clock signal. (c) represents a count value of a counter, in which the counter circuit 330 has the noise erasure time set to "3" to cyclically output the count values 0, 1, or 2. (d) indicates the occurrence of a writing operation to the MEM 0 300 (the downward arrow indicates that the first comparator 320 outputs a non-coincident result) and a comparing operation by the second comparator 340 (the upward-downward arrow indicates -that the first comparator 320 outputs a coincident result). (f) indicates the data outputted by the MEM 2 850.

Next, an operation of erasing noise less than or equal to count 3 is described below.

The input signal indicates a change at the time point between 3 and 4 (a change from "0" to "1"), and the counter value "0" at this time point is written to the MEM 0 300. The output data (f) should not be changed. At the time point between 5 and 7 in the time (a), the second comparator 340 compares the counter value with the value "0" written to the MEM 0 300. The value "0" written to the MEM 0 300 matches the count value when it turns to "0". Then, the input signal is not determined to be ,noise and the input signal value is written to the MEM 2 350. Thus, the output data (f) change to "1".

At the time point between 8 and 9 of the time (a), the input signal indicates another change (from "1" to "0"). The count value "2" at this time point is written to the MEM 0 300 as described above. The change in the input signal cannot be determined to be or not to be noise, and the output (f) is not changed.

At the time points between 11 and 12 and between 12 and 13 of the time (a), the signal indicates other changes, and "2" and "0" are sequentially written to the MEM 0 300. At the time point 16, the counter value "0" matches the value "0" written to the MEM 0 300, and the input data "0" are written to the MEM 2 350, causing the output data (f) to be changed to "0". In the above process, the noise generated at the time point of the input signal between 9 and 11 can be erased and the signal of 9 in width in a time unit can be restored.

Next, the second preferred embodiment is explained below. In the second embodiment, noise can be erased for plural pieces of input data. For example, the noise erasing operation is performed on digital signal inputs through a plurality of telephone lines.

Figure 5:
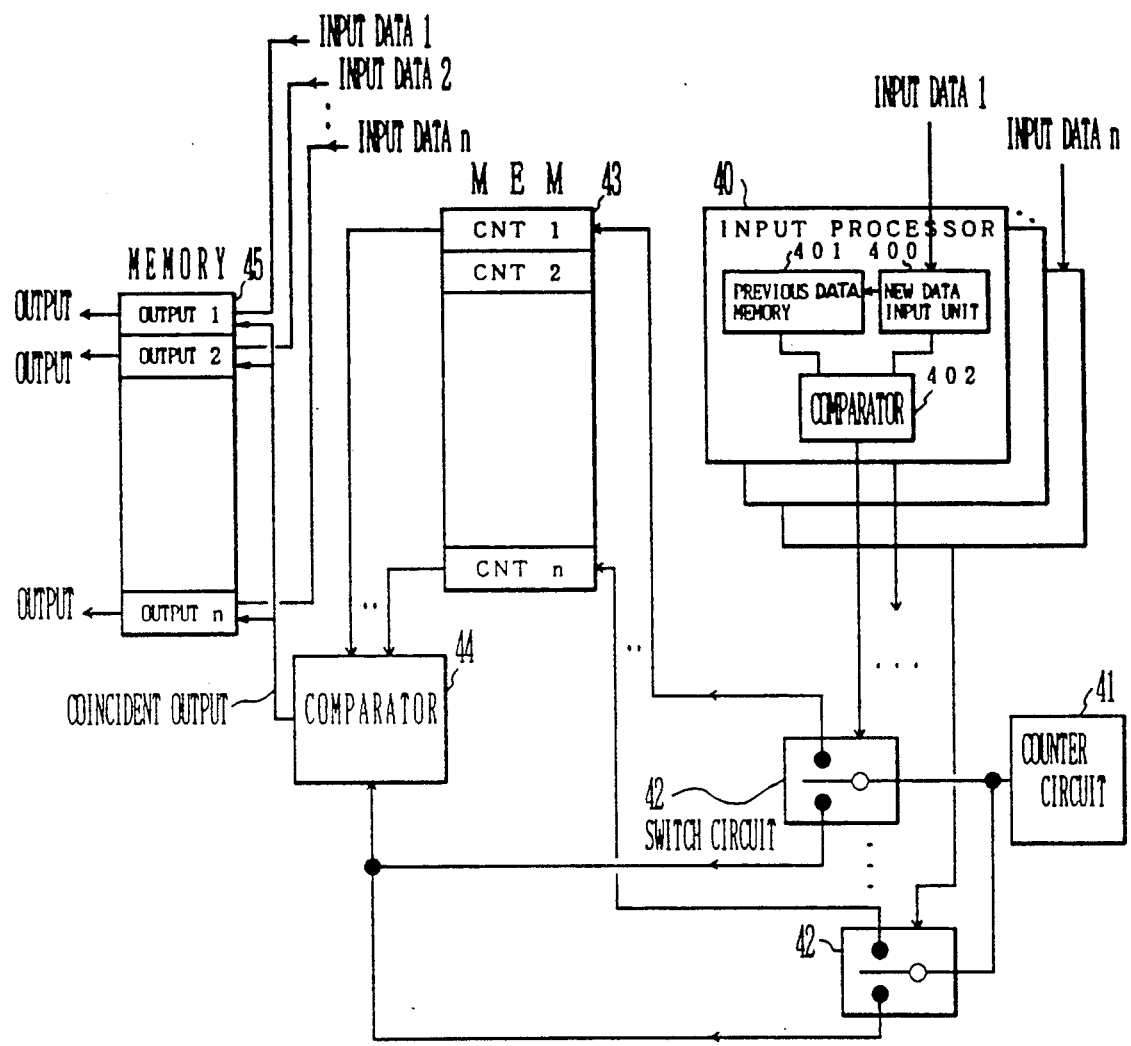
FIG. 5 shows the configuration of the second preferred embodiment.

FIG. 5 shows the configuration of the second embodiment.

In FIG. 5, 40 are a plurality of (n) input processors (40-1, 40-2, ..., 40-n) provided corresponding to plural pieces of input data. Each of the input processors is for detecting a change in input data, and comprises a new data input unit 400 similar to the one in the first embodiment (shown in FIG. 3), a previous data memory 401, and a first comparator 402. In FIG. 5, 41 is a counter circuit; 42 is a switch circuit provided for each piece of input data to be switched according to a coincident/non-coincident result outputted by the comparator 402 in the input processor 40; 43 is a memory (MEM) having an area for storing a counter value (CNT1 - CNTn) corresponding to each piece of input data; 44 is a comparator for performing a comparing operation corresponding to each piece of input data in a time divisional manner; and 45 is a memory having an area for storing the output data corresponding to each piece of input data.

In this embodiment, the plurality of input processors 40, the switch circuit 42, the memory 43, and the memory 45 are provided to erase noise in plural pieces of input data. The counter circuit 41 and the comparator 44 can be shared. The comparator 44 processes plural pieces of input data in a time divisional manner using a high-speed clock, and controls the writing of input data being processed into the area for storing the corresponding output data in the memory 45.

Figure 6:
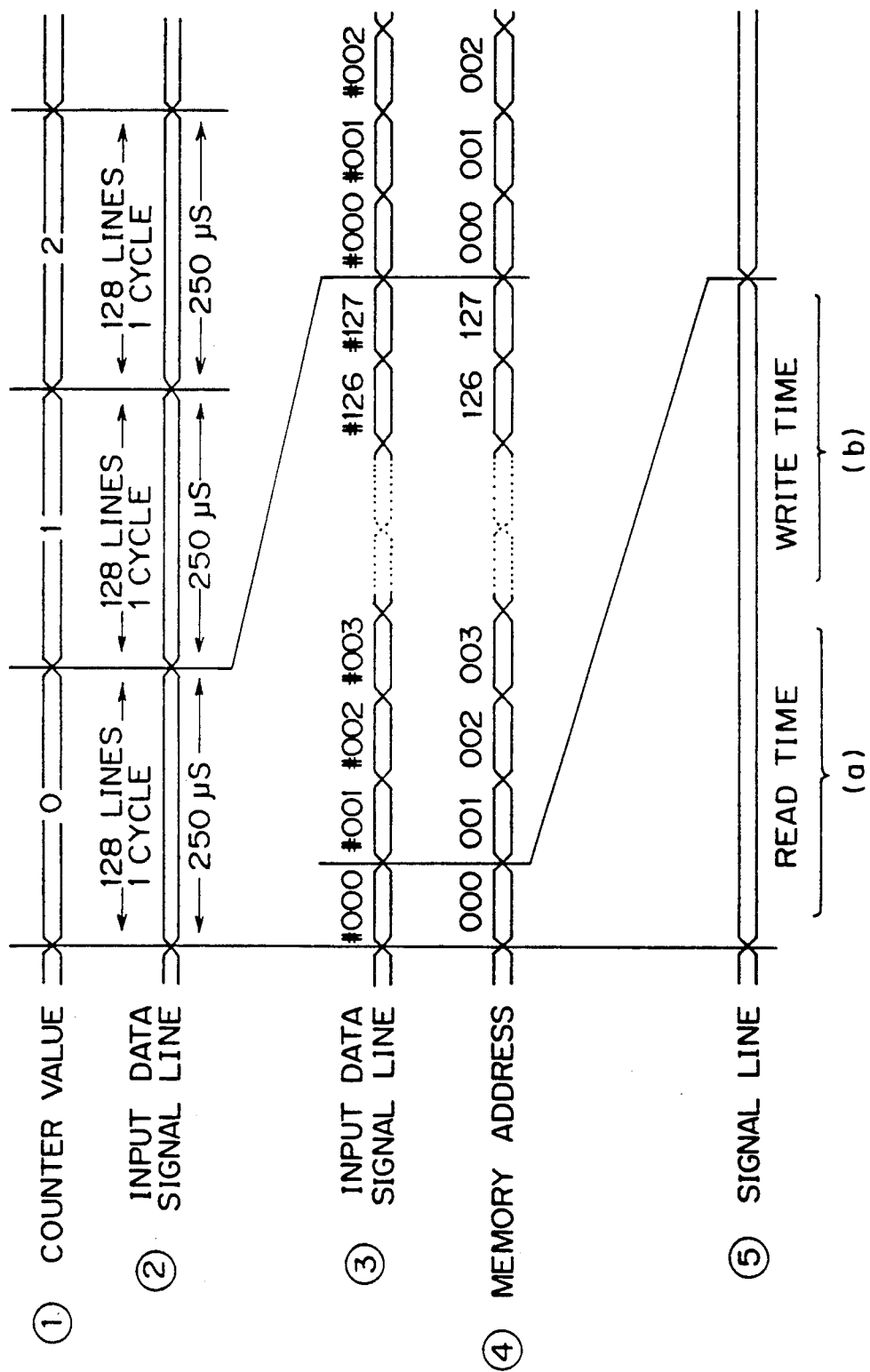
FIG. 6 is a view for explaining the timing of the signal line of the second preferred embodiment.

FIG. 6 is a view for explaining the timing of a signal line of the second preferred embodiment, by referring to an example of noise erasure in which 128 lines of input data are inputted at a 250 μs clock cycle.

In FIG. 6, ① indicates a value outputted by the counter circuit 41 and indicates a count-up timing. ② indicates an input signal line. 128 lines of input data are inputted in one cycle of 250 μs. ③ is an enlarged view of the input signal line ②. 128 pieces of input data (1-128) are inputted to the input processors 40 (40-1-40-128) in one 250 μs cycle. ④ indicates a timing of a memory address. This address is a memory area of each line indicated by ③. ⑤ indicates a memory process (READ/WRITE) of one line.

For each line, the previous data are read from the previous data memory 401 (READ TIME (a) indicated by ⑤), and are compared by the comparator 402 with the input data provided by the new data input unit 400. Then, determination is made as to whether or not a change has occurred. If yes, a WRITE clock is issued to the previous data memory 401 and the MEM 43 in the memory area for the corresponding line to write the current input data and the counter value ① (refer to WRITE TIME (b) in ⑤). Simultaneously, the comparator 44 compares the count value ① with the count value of the MEM 43 for the corresponding line. Regardless of the comparison result, the result by the comparator 402 is assigned a higher priority. Thus, a noise erasure completion signal is not outputted.

When the comparator 402 determines "no changes", nothing is written to the memory area (masking the WRITE clock). Simultaneously, the comparator 44 compares the count value. If a non-coincident result is outputted, the noise erasing process is not completed (determination is not made as to whether or not the data indicate noise), and control is transferred to the process of the next input data. If a coincident result is outputted, the counter value indicates no change in the input signal (the data do not refer to noise), and the input data are written into the output value storage area for the corresponding line in the memory area.

The above process is performed within 1 data time period of an input signal. Processes for 128 lines are performed in one cycle.

When the circuit is assigned 128 lines for input data, a noise erasing time of 14 ms (the maximum retaining time of a signal referred to as noise), and a clock cycle of 250 µs, the counter value of the counter circuit 41 indicates 56, and the necessary memory capacity for one line comprises a total of 8 bits: 1 bit for the previous data memory 401, 6 bits for the MEM 43, and 1 bit for the output memory 45. When the memory is realized in an LSI for 128 lines, 5,080 gates are required.

If a similar noise erasing process is performed in the prior art technology, the necessary memory capacity for one line comprises a total of 57 bits: 56 bits for the memory 120, and 1 bit for the memory 150. The necessary number of gates is 23,500.

As described above, the present invention realizes a noise erasing system with a ¼ the number of gates of the prior art technology.

Additionally, in the second preferred embodiment, the comparator 44 and the counter circuit 41 can be shared among plural pieces of input data, thus reducing the necessary number of circuits.

What is claimed is:

1. An apparatus for providing output data having high clarity based on previous data and at least one time-series digital input signal within a time period, comprising:
    counter means for cyclically counting clock signals produced by a clock independent of the input signal in the time period;
    data change detecting means for detecting a first comparison result between input data extracted from the input signal by said clock and previous data extracted by said clock, the first comparison result being selected from a coincident result and a non-coincident result;
    count value storage means for storing in memory a counter value provided by said counter means when the first comparison result detected by said data change detecting means is the non-coincident result;
    comparing means for comparing the count value stored in the storage memory with a second counter value provided by said counter means in order to output a second comparison result selected from the coincident result and the non-coincident result, detecting means is the coincident result; and
    output means for storing the input data as output data when the second comparison result detected by said comparing means is the coincident result.

2. A digital noise apparatus according to claim 1, further comprising:
    a plurality of input signal processing means for detecting a change in a plurality of input signals and wherein:
    said count value storage means stores each count value corresponding to the plurality of input signals; and
    said output means storing a plurality of output data corresponding to a plurality of input signals.

3. An apparatus for providing output data having high clarity based on previous data and time-series digital input signals within a time period, comprising:
    counter means for cyclically counting clock signals produced by a clock in the time period;
    a plurality of input signal processing means, each receiving a corresponding one of the input signals, for detecting corresponding first comparison results between plurality of corresponding input data extracted from corresponding input signals by said clock and a plurality of corresponding previous data extracted by said clock, the first comparison results being selected from a coincident result and a non-coincident result;
    count value storage means for storing a first counter value provided by said counter means in each memory location corresponding to each corresponding input signal processing means detecting the first comparison result having the non-coincident result;
    comparing means for comparing first counter values stored in corresponding memory locations with a second counter value provided by said counter means in order to output a corresponding second comparison result for each corresponding first comparison result having the coincident result detected by the corresponding input signal processing means, wherein the second comparison result is selected from the coincident result and the non-coincident result; and
    output means for storing corresponding input data as corresponding output data for corresponding second comparison results having the coincident result detected by said comparing means.

* * * * *

UNITED STATES PATENT AND TRADEMARK OFFICE
CERTIFICATE OF CORRECTION

PATENT NO. : 5,329,538
DATED : July 12, 1994
INVENTOR(S) : Hisato KAWANO et al.

It is certified that error appears in the above-indentified patent and that said Letters Patent is hereby corrected as shown below:

Column 8, Claim 2, Lines 13-14, change "A digital noise apparatus" to --The apparatus for providing output data--.

Signed and Sealed this

Fourth Day of October, 1994

Attest:

BRUCE LEHMAN

Attesting Officer          Commissioner of Patents and Trademarks